Figure 1:
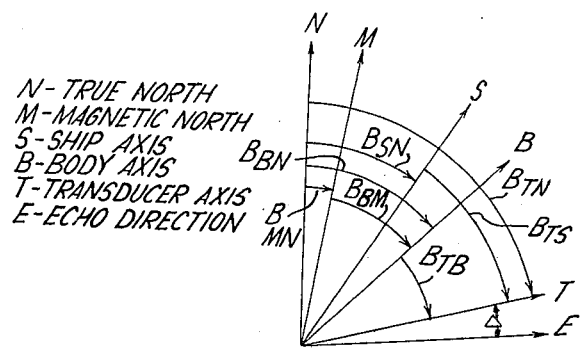

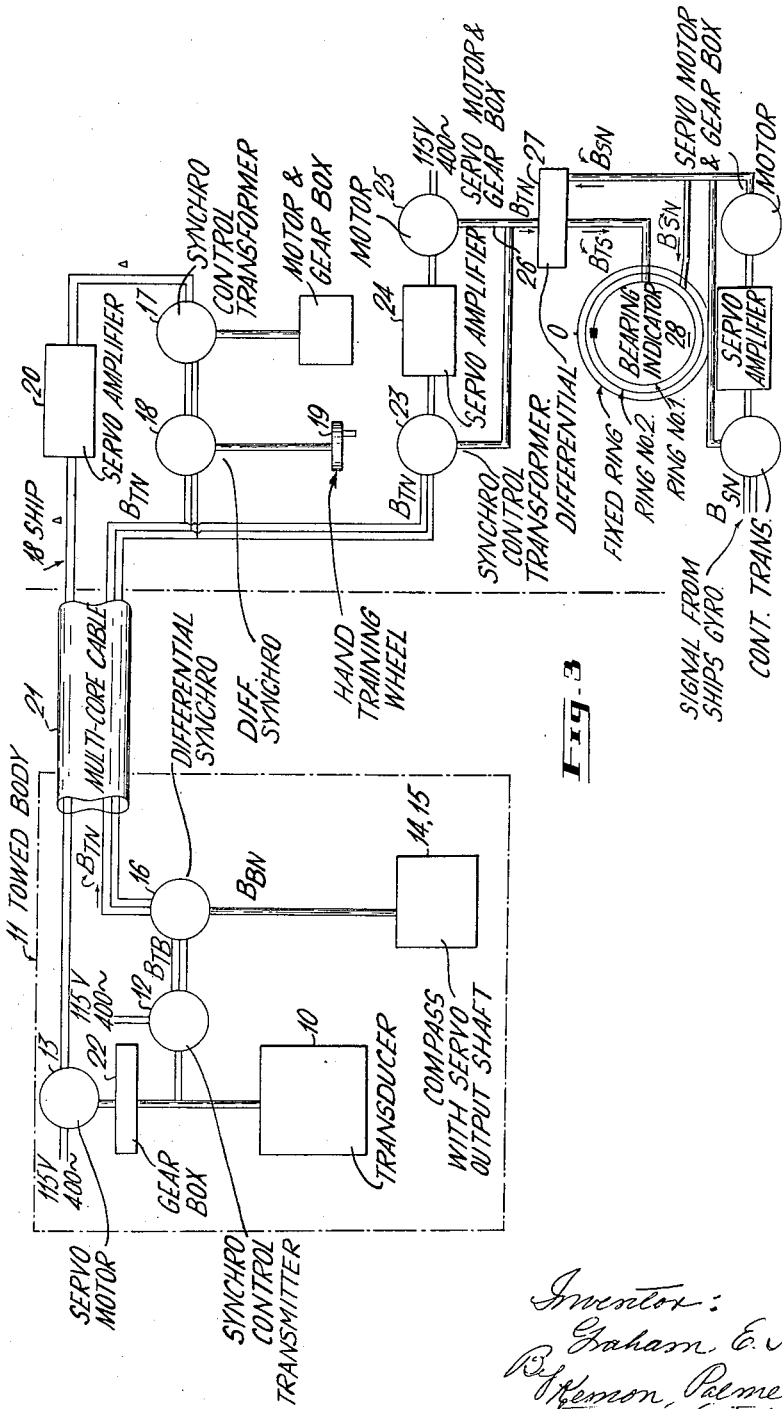

United States Patent Office 3,119,189
Patented Jan. 28, 1964

3,119,189
HEADING SYSTEM
Graham Everett Hyne, Dartmouth, Nova Scotia, Canada, assignor to Her Majesty the Queen in right of Canada as represented by the Minister of National Defence
Filed Mar. 27, 1961, Ser. No. 98,513
Claims priority, application Canada Aug. 31, 1960
2 Claims. (Cl. 33—222)

The present invention relates to apparatus for controlling the heading of a directional tranducer in a sonar system.

In any sonar system a datum line or point of reference to which all bearing information is related is essential. In prior art systems the ship itself constitutes this reference. In a towed sonar system, a body is towed sometimes as much as three hundred feet behind the ship at depths to 300 feet and electro-acoustic transducers are mounted in this body. Consequently, two reference points exist—the towed body and the ship. In such a system, all detection is made with reference to the towed body.

The direction of the towed body per se is variable because of the ship's movements, currents and other factors existing under operating conditions. A system is required for controlling the physical position of the transducers regardless of the behavior of the towed body.

In accordance with the present invention a sonar system wherein a directional transducer is positioned in a body towed behind a vessel is provided with apparatus for controlling the heading of the directional transducer, comprising a compass fixed to the body and adapted to provide an output indicative of the compass heading of the body. Means are mounted on the body and coupled to the transducer and are adapted to indicate the relative bearing of the transducer in relation to the body. Means are also mounted in the body, and coupled to the compass and to said means adapted to indicate the relative bearing of the transducer to the body, to provide an output indicative of the compass heading of the transducer. Means are included which are adapted to compare the compass heading of the transducer and a desired heading. Drive means are provided mounted in the body and adapted to rotate the transducer relative to the body and in response to the output indicative of the difference between the compass heading and the desired heading whereby the difference is substantially reduced to zero.

In practice it was found necessary to attach the compass to the body rather than to the transducer for several reasons. In case of compass failure an alternative, even though approximate method of determining transducer position, was considered necessary. With the present invention this can be accomplished by switching the compass out of the servo loop when the relative bearing of the transducer to the towed body axis is obtained. Two types of compasses, flux gate and miniature gyro, plus their amplifiers and watertight containers could not be accommodated when attached to the transducer without increasing the size of the towed body. Considerable effort was expended in keeping the towed body as small as possible. Acoustic noise radiated from the compass is difficult to shield if the compass is attached to the transducer. With the compass mounted on the body the noise radiated to the transducer may be shielded and absorbed by shock mounts, air, lead or rubber baffles.

In addition, the compass is tied to the element which has the lowest maximum rate of change in terrestrial bearing. In this case, when the transducer is being trained in a direction which is opposite to the direction of change in terrestrial bearing of the body (the maximum and worst condition) the smallest rate of change in terrestrial bearing is experienced by the body. This is important if the response time of the compass is large.

Figure 2:
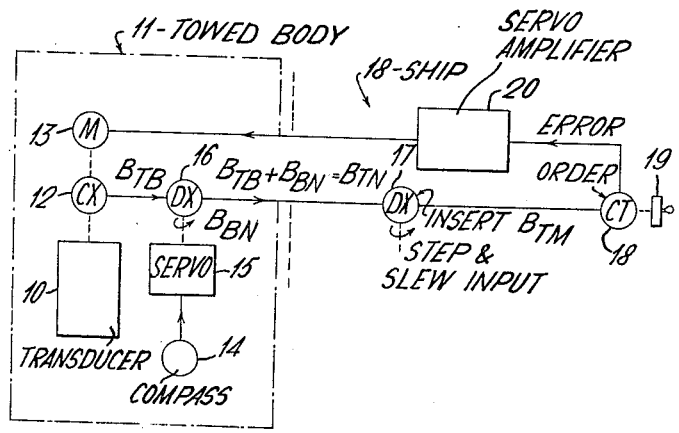

In drawings which illustrate an embodiment of the invention:

FIGURE 1 is a graphical diagram of the angular relations existing among the ship, the towed body and the transducer, FIGURE 2 is a block diagram of apparatus constructed in accordance with the present invention, and FIGURE 3 is a more detailed block diagram of apparatus in accordance with the invention.

Referring to FIGURE 1, the vector N indicates true north, the vector M indicates magnetic north, the vector S indicates the ship axis, the vector B indicates the body axis, the vector T, the transducer axis and the vector E indicates the direction of the target or echo.

As may be seen from the drawing the angular difference between true north and magnetic north is indicated as $B_{MN}$. The angular difference between true north and the axis of the body is indicated by $B_{BN}$. The bearing of the body with respect to magnetic north is indicated as $B_{BM}$. The bearing of the transducer with respect to the ship is indicated as $B_{TS}$ and the bearing of the transducer with respect to the body is $B_{TB}$. The bearing of the transducer with respect to true north is indicated as $B_{TN}$, and the bearing of the echo with respect to the transducer is indicated as $\Delta$. These bearing designations apply regardless of the relative positions of the ships axis, the body axis, the transducer axis, and the echo direction with respect to true or magnetic north.

The block diagram is FIGURE 2 shows a transducer 10 mounted in the towed body indicated as 11 and coupled to a synchro control transmitter 12 and a servo motor 13. The synchro control transmitter 12 is adapted to generate an electrical function characteristic of the bearing $B_{TB}$. A compass 14 which may be a magnetic compass such as a flux-gate corrected to read true north or a miniature gyro compass is mounted fixedly to the body 11 and has a mechanical output through a servo amplifier 15 to a synchro differential transformer 16. The output of the servo amplifier 15 is a mechanical shaft position indicative of the bearing $B_{BN}$. The synchro differential transformer 16 combines the bearings $B_{TB}$ and $B_{BN}$ to form their sum which is fed to a differential transformer 17 mounted in the ship 30. The output of the synchro differential transformer 16 is $B_{TB}+B_{BN}=B_{TN}$ or the terrestrial bearing of the transducer. The synchro differential transformer 17 may be used to insert a mechanical shaft position input into the transducer control loop in order to modify the bearing $B_{TN}$ if required. There are several possible uses of the differential transformer 17, such as making further corrections to the "terrestrial" bearing of a transducer due to errors in the reading of the compass 14. It is also possible to insert programmed search patterns into the transducer heading for searching for targets. The synchro control transformer 18 is fed from the output of the synchro differential transformer 17 and provides an electrical output indicative of the difference between the terrestrial heading of the transducer 10 and the desired heading which is fed into a control transformer 18 by the hand wheel 19. The output from the control transformer 18 is fed to the servo amplifier 20 which controls the motor 13 mounted in the towed body to position the transducer 10 in accordance with the desired bearing set on either synchro differential transformer 17 or control transformer 18.

Thus the reference for the heading of the transducer 10 is the compass 14 located in the towed body 11. The electrical output of the compass 14 feeds the servo amplifier 15 which mechanically drives a synchro differential transformer 16 in the main servo loop by making use of signals including the heading of the transducer 10 relative to the compass 14, and by signals from the ship's gyro, the heading of the transducer relative to ship's heading may be presented on a suitable bearing display. By the operation of the hand wheel 19 aboard the ship the transducer may be automatically set at any bearing relative to the ship. In addition the heading of the transducer 10 is stabilized against motion of the body.

FIGURE 3 shows in further detail an embodiment of the invention including apparatus for indicating at a remote location in the ship the transducer bearing.

As shown in FIGURE 3 the electrical equipment contained within the towed body is connected to the ship 18 by means of a multi core cable 21. The magnetic bearing of the transducer 10 is derived from the synchro differential transformer 16 and fed via the multi core cable 21 to the synchros 17 and 18 which derive an error signal which is fed to the amplifier 20 to operate the motor 13 through a gear box 22 to drive the transducer 10 to the position set by the synchros 17 and 18.

Further, apparatus is included for indicating the bearing of the transducer with respect to the ship's axis which consists in the synchro control transformer 23, the input of which is the magnetic bearing of the transducer $B_{TM}$, which synchro control transformer drives a servo amplifier 24 which in turn operates a motor 25 having an output shaft 26. The output shaft is mechanically coupled to the synchro control transformer 23 to form a closed servo loop so the position of the motor shaft is an accurate representation of the magnetic bearing of the transducer. The position of the motor shaft 26 is applied to a differential gearing 27 where it is compared with bearing of the ship to give an output indicative of the bearing of the transducer with respect to the ship. The bearing of the transducer with respect to the ship is fed to a mechanical indicator 28. The mechanical indicator 28 also gives an indication of the bearing of the ship with respect to true north. The bearing of the transducer with respect to the ship and the ship's bearing may be arranged on concentric dials and if the position of the ship with respect to north is maintained vertical, then the bearing of the transducer with respect to the ship will be shown as an angular deviation from this vertical line.

I claim:
1. A sonar system comprising in combination:
   a vessel;
   a body for towing behind said vessel;
   a directional transducer mounted within said body;
   a synchro control transmitter within said body and connected with said transducer for generating an electrical function proportional to the angular differences between the bearing of said transducer and the bearing of said body;
   a magnetic compass fixedly mounted within said body having a mechanical output which is proportional to the relative bearing of said body to magnetic north;
   a first servo amplifier within said body and mechanically connected to said compass for producing a mechanical output which is proportional to the output from said compass;
   a synchro differential transformer within said body, electrically connected to said transmitter, and further connected with said first servo amplifier, responsive to the mechanical output from said first servo amplifier and to the output from said transmitter, and having an output proportional to the sum of the electrical output from said transmitter and the mechanical output from said first servo amplifier;
   a synchro control transformer aboard said vessel, electrically connected to said synchro differential transformer and including manual adjusting means for feeding a desired heading thereinto, said control transformer producing an electrical output proportional to the difference between the terrestrial heading of the transducer and the desired heading;
   a second servo amplifier aboard said vessel electrically connected to said control transformer for producing an electrical output proportional to the output of said control transformer;
   an electric motor within said body, associated with said transmitter and said transducer and electrically connected to said second servo amplifier for positioning said transducer in accordance with the desired heading;
   and a second synchro differential transformer connected between said synchro differential transformer associated with said first servo amplifier and said synchro control transformer, said second synchro differential transformer being effective to modify the bearing of said transducer relative to true north.

2. The apparatus of claim 1 wherein said second synchro differential transformer is carried within said vessel.

References Cited in the file of this patent
UNITED STATES PATENTS

| | | |
|---|---|---|
| 1,999,645 | Wittkuhns | Apr. 30, 1935 |
| 2,296,041 | Luck | Sept. 15, 1942 |
| 2,361,433 | Stuart | Oct. 31, 1944 |
| 2,473,423 | Gorton | June 14, 1949 |
| 2,520,922 | Framme et al. | Sept. 5, 1950 |
| 2,593,902 | Lee | Apr. 22, 1952 |
| 2,619,733 | Horton et al. | Dec. 2, 1952 |
| 2,882,602 | Gray et al. | Apr. 21, 1959 |